US 6,624,967 B1

(12) United States Patent
Suwito

(10) Patent No.: US 6,624,967 B1
(45) Date of Patent: Sep. 23, 2003

(54) INTEGRATED SPACER CLAMP FOR DISK DRIVE

(75) Inventor: Wantjinarjo Suwito, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/369,939

(22) Filed: Feb. 18, 2003

Related U.S. Application Data

(63) Continuation of application No. 09/865,992, filed on May 25, 2001.
(60) Provisional application No. 60/239,135, filed on Oct. 10, 2000.

(51) Int. Cl.$^7$ .............................................. G11B 17/02
(52) U.S. Cl. .................................................... 360/98.08
(58) Field of Search ........................... 360/98.08, 99.05, 360/99.12

(56) References Cited

U.S. PATENT DOCUMENTS

| | | | | |
|---|---|---|---|---|
| 5,249,090 A | * | 9/1993 | Fehse ....................... | 360/98.08 |
| 5,274,517 A | | 12/1993 | Chen ........................ | 360/98.08 |
| 5,333,080 A | | 7/1994 | Ridinger et al. ......... | 360/99.12 |
| 5,490,024 A | | 2/1996 | Briggs et al. ............ | 360/99.12 |
| 5,517,376 A | | 5/1996 | Green ...................... | 360/98.08 |
| 5,528,434 A | | 6/1996 | Bronshvatch et al. .... | 360/98.08 |
| 5,592,349 A | * | 1/1997 | Morehouse et al. ..... | 360/98.08 |
| 5,636,083 A | | 6/1997 | Sanada .................... | 360/98.08 |
| 5,777,822 A | | 7/1998 | Schuh ..................... | 360/97.03 |
| 5,777,832 A | | 7/1998 | Yi et al. ................... | 360/135 |
| 5,790,345 A | | 8/1998 | Alt ........................... | 360/98.08 |
| 5,790,346 A | | 8/1998 | Fletcher ................... | 360/99.12 |
| 5,838,516 A | | 11/1998 | Staggers et al. ......... | 360/98.08 |
| 5,875,171 A | | 2/1999 | Albrecht et al. ............ | 369/281 |
| 5,880,906 A | | 3/1999 | Lindrose .................. | 360/98.08 |
| 5,886,852 A | | 3/1999 | Kikuchi et al. .......... | 360/98.08 |
| 5,940,244 A | | 8/1999 | Canlas et al. ............ | 360/98.08 |
| 5,943,184 A | | 8/1999 | Kelsic et al. ............. | 360/98.08 |
| 5,982,581 A | | 11/1999 | Kazmierczak et al. ... | 360/98.08 |
| 6,255,750 B1 | | 7/2001 | Mohajerani et al. ..... | 310/51 |

OTHER PUBLICATIONS

Engineering drawing entitled "Maxtor Clamp, Disk, Big Hole," dated Oct. 1, 1995.
Engineering drawing entitled "Maxtor Disk Clamp, Alum, Lightning," dated Jan. 10, 1998.

* cited by examiner

*Primary Examiner*—Robert S. Tupper
(74) *Attorney, Agent, or Firm*—Sheridan Ross P.C.

(57) ABSTRACT

An integrated spacer clamp for securing data storage disks to a hub of a disk drive mechanism includes an integral body and spacer flange. The spacer flange separates the body and the disk a predetermined distance apart. The body includes bores that receive members for securing the clamp to the hub, and includes one or more grooves for distributing the securing force of the securing members.

13 Claims, 1 Drawing Sheet

INTEGRATED SPACER CLAMP FOR DISK DRIVE

CROSS-REFERENCE TO RELATED APPLICATIONS

This is a continuation application of pending prior application Ser. No. 09/865,992, filed May 25, 2001 and entitled "Integrated Spacer Clamp for Disk Drive", which claims priority from U.S. Provisional Patent Application No. 60/239,135, filed on Oct. 10, 2000, and entitled "Integrated Spacer Clamp for Rigid Disk Files" the disclosure of which is incorporated herein by reference in its entirety.

BACKGROUND OF THE INVENTION

1. Field of the Invention

The present invention relates to disk drive systems and, more particularly, to integrated spacer clamps for securing one or more disks to a hub of a spindle motor used in disk drive systems.

2. Description of Related Art

Disk drive data storage systems typically include one or more data storage disks and a spindle motor for rotating them. The spindle motor drives a spindle hub that supports the disks; and a clamp secures the disks to the hub.

In this regard, data storage disks have a central bore that receives the spindle hub. The clamp typically includes a circular or disk-shaped body and a number of screws that secure the body to the hub. As a result, disks positioned below the clamp body are secured to the hub. In addition, spacers are typically placed on both sides of each disk. For example, in a disk drive with a single disk, the arrangement comprises in series, a clamp, a spacer adjacent the clamp, a disk, a spacer on the opposite of the disk, and the hub. Any additional disk will likely have a spacer disposed on each side of it as well.

Specific examples of some prior art clamps include U.S. Pat. Nos. 5,838,516; 5,875,171; 5,777,832; 5,880,906; 5,274,517; 5,490,024; 5,528,434; and 5,790,346. Although each of these prior art clamps may have specific constructions and offer specific improvements, one common structural characteristic is that each incorporates a curved or rounded surface which comes into contact with a disk or spacer mounted over the hub of a disk drive.

The integrated spacer clamp of the present invention includes a spacer portion, eliminating the need for a separate spacer between the clamp and the adjacent disk. This integrated spacer clamp provides a construction that simplifies the overall hub arrangement, minimizing the cost of fabrication and assembly of the hub arrangement, reducing the likelihood of malfunction in the disk drive system, and providing effective and consistent performance.

SUMMARY OF THE INVENTION

In accordance with the preferred embodiment of the present invention, an integrated spacer clamp that secures one or more data storage disks to a hub includes a circular or disk-shaped clamp body having a predetermined height and defining top and bottom faces and a center bore through which a portion of the hub extends. The integrated spacer clamp also includes a spacer flange that extends outwardly of the bottom face of the clamp body, generally perpendicularly to the clamp body. A continuous neck portion or web interconnects the clamp body to the spacer flange. The spacer flange lies along edge portions of the clamp body, and the spacer flange has a height substantially greater than the height of the clamp body. The spacer flange has a flat, distal surface for contacting a data storage disk.

The clamp body has one or more securing bores that extend through the body and are spaced radially from the center bore. The clamp body also has one or more grooves formed in its top face, which extend a predetermined concentric distance adjacent an exterior edge of the body, and spaced radially outward from the securing bore or bores. The grooves distribute the force created by a securing member that extends through the securing bore and attaches to the spindle hub. A fewer number of screws can be used to secure the spacer clamp because there is an increased distance between the point of applied securing force or load (for example, at the screw heads) and the contact point between the spacer clamp and the underlying disk. This increased distance allows for greater distribution of force by the screws. Without the increased distance, using a lesser number of screws would result in unacceptable disk warp or waviness due to the extra force generated from each screw to maintain a total equal clamp load. The increased distribution of force through increasing the distance over which a force is applied is consistent with St. Venant's principle. Also, the load transmitted from the screws to the contact point between the spacer flange and the underlying disk is further distributed because of the change in cross sectional area from larger to smaller, and then back to larger provided by the geometry of the spacer clamp. Specifically, the load induced by the screws is initially transmitted to the clamp body, then through the smaller area neck or web, and finally through the spacer flange. The load becomes concentrated along the neck or web; however, the load is then evenly distributed through the spacer flange.

BRIEF DESCRIPTION OF THE DRAWINGS

For a more complete understanding of this invention, one should now refer to the preferred embodiment illustrated in the accompanying drawings and described in further detail below.

While the following disclosure describes the invention in connection with the preferred embodiment, one should understand that the invention is not specifically limited to this embodiment. Furthermore, one should understand that the drawings are not to scale and that graphic symbols, diagrammatic representations, and fragmentary views, in part, may illustrate the embodiment.

DETAILED DESCRIPTION OF THE DRAWINGS

Figure 3:
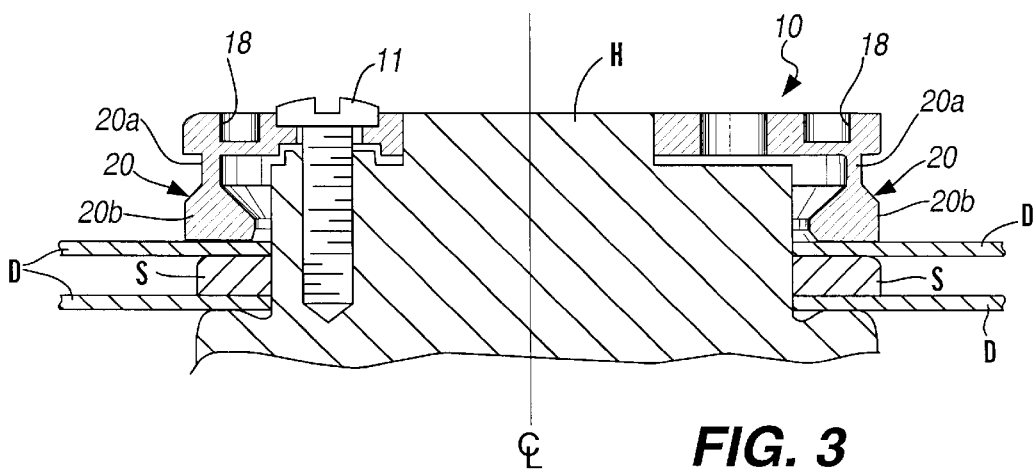
FIG. 3 is a sectional view taken along line 3—3 of FIG. 2.

Turning now to the drawings and referring specifically to FIG. 3, a disk drive disk and hub assembly generally includes data storage disks D, a spindle motor hub H, a spacer S disposed between the disks D, and the integrated spacer clamp of the present invention 10. The disks D have a central bore through which the spindle motor hub H extends. The spacer S lies between the disks D to space them a predetermined distance apart; and the integrated spacer clamp 10 along with three securing members in the form of screws 11 secure the stack of disks D and the spacer S to the hub H. Tightening of the screws forces the integrated spacer clamp 10 against the upper disk and the disks D and spacer S against the hub H, thus coupling the disks to the hub so that the disks and the hub rotate together.

The integrated spacer clamp 10 includes a disk-shaped clamp body 12 which is a one-piece member formed of an aluminum alloy (e.g. an aluminum 6061-T6 alloy) or any other suitable material. The body 12 has a central bore 13, a top face 14 and a bottom face 15. The body also has a plurality of securing bores 16 through which the securing screws 11 extend, and access bores 17 that allow access to weight receiving bores (not shown) formed on the hub H which receive weights (not shown) for balancing the clamp and Disks D when rotating. The securing bores 16 and the access bores 17 have centers that lie spaced apart on substantially the same circumference, a predetermined radial distance from the center of the central bore 13.

Figure 1:
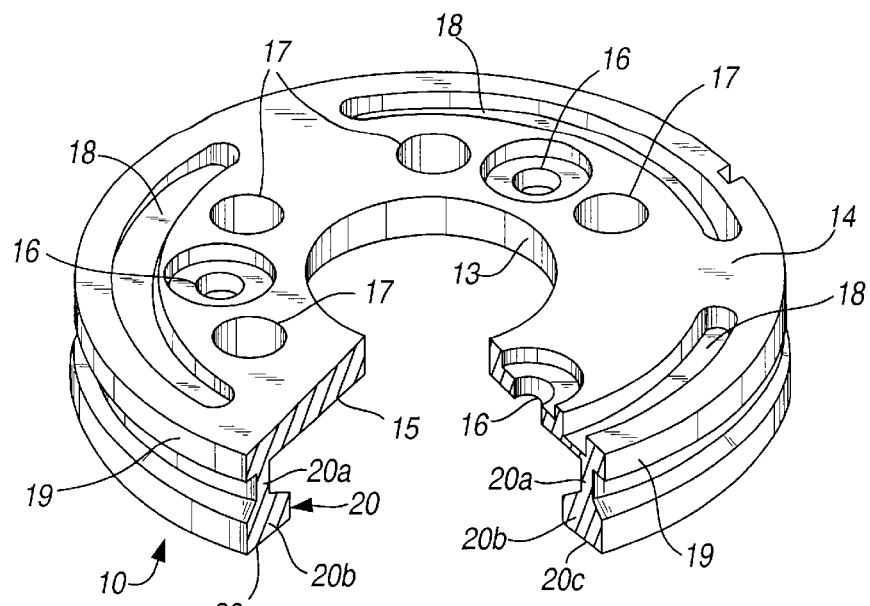
FIG. 1 is a perspective view of the integrated spacer clamp of the present invention with a portion cut away to show its cross-sectional configuration.
Figure 2:
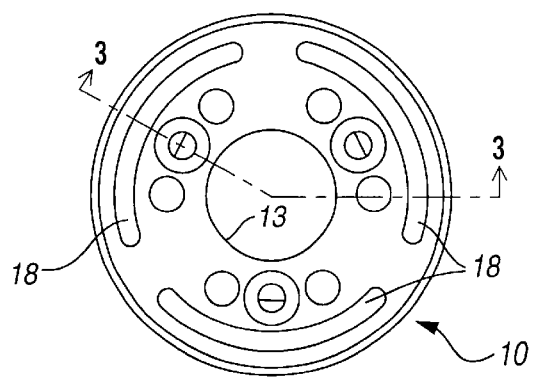
FIG. 2 is a reduced plan view of the clamp of FIG. 1, showing the integrated spacer clamp secured to a hub assembly.

The clamp 10 further defines three elongate grooves 18 formed on the top, face 14 of the body 12 in the space between the bores 16 and 17 and the exterior edge 19 of the body. Each of the grooves 18 lies adjacent a corresponding securing bore 16 and helps distribute the load of the screw that extends through the corresponding bore. Although FIGS. 1–3 illustrate three grooves 18, the integrated spacer clamp 10 may alternatively include more than three or less than three grooves, or the clamp may include one continuous circular groove or the groove(s) may uniformly vary in depth.

The bottom face 15 of the clamp, 10 is generally flat. An annular spacer flange 20 extends along the periphery of the clamp near exterior edge 19, and extends generally perpendicular to the body 12. The spacer 20 has a neck portion or web 20a and an end portion 20b. The end portion 20b is substantially larger in cross-sectional area than the neck portion 20a. End portion 20b has a flat, distal surface 20c for contacting a disk D. The spacer flange 20 has a height as measured from the interface of neck portion 20a and face 15 to distal surface 20c.

The integrated spacer 10 of the present invention eliminates the need for a separate spacer between it and an adjacent disk. The construction of the spacer clamp simplifies the overall hub assembly, minimizing the cost of fabrication, shortening the time for assembly and reducing the likelihood of malfunction.

While the above description and the drawings disclose and illustrate a preferred embodiment, one should understand, of course, that the invention is not limited to this embodiment. Those skilled in the art to which the invention pertains may make other modifications and other embodiments employing the principles oft his invention, particularly upon considering the foregoing teachings. Therefore, by the appended claims, the applicant intends to cover any modifications and other embodiments as incorporate those features which constitute the essential features of this invention.

What is claimed is:

1. An integrated spacer clamp for clamping one or more data storage disks to a hub of a disk drive, said integrated spacer clamp comprising:

a body having a disk shape, a predetermined height defining top and bottom faces thereof, a center bore extending through said body for receiving the hub, and a peripheral edge;

a spacer flange including:

(i) a neck portion having first and second ends, said first end connected to said body;

(ii) an end portion connected to said second end of said neck portion;

(iii) a flat, distal surface on said end portion for contacting a data storage disk; and wherein said spacer flange is disposed along said peripheral edge of said body, said neck portion of said spacer flange extends generally perpendicularly from said body, and said body and said spacer flange are a one piece, integrally formed unit.

2. The clamp of claim 1, wherein:

said body further includes at least one securing bore extending through said body and radially spaced from said center bore.

3. The clamp of claim 1, wherein:

said body further includes at least one groove formed on said top face.

4. The clamp of claim 3, wherein:

said at least one groove is arcuate shaped.

5. The clamp of claim 1, wherein:

said body further includes at least one access bore formed on said top face.

6. An integrated spacer clamp especially adapted for clamping data storage disks to a hub of a disk drive, said integrated spacer clamp comprising:

a body having a predetermined height, top and bottom faces disposed on opposite sides of said body, a center bore extending through said body for receiving the hub, and said body having a disk shape; and means connected to said body for spacing said body from a storage disk placed in contact with said means for spacing, said body and said means for spacing being of one piece construction, said means for spacing including an end portion having a flat distal surface for contacting the data storage disk, and a neck portion interconnecting said end portion to said body, said neck portion extending generally perpendicular to said bottom face of said body.

7. An integrated spacer clamp, as claimed in claim 6, wherein:

said means for spacing has a height greater than a height of said body.

8. An integrated spacer clamp, as claimed in claim 6, wherein:

said body further includes at least one securing bore extending therethrough and radially spaced from said center bore.

9. An integrated spacer clamp, as claimed in claim 6, further including:

at least one arcuate groove formed on said top face of said body.

10. In a clamp of the type used for clamping one or more data storage disks to a hub of a disk drive, the improvement comprising:

means connected to said clamp for spacing said clamp from a storage disk placed in contact with said means for spacing, said clamp and said means for spacing being of one piece construction, said means for spacing including an end portion, and a neck portion interconnecting said end portion to said clamp, said neck portion extending substantially perpendicularly to said clamp.

11. In a computer disk drive of the type including at least one data storage disk and a hub for securing the data storage disk to the disk drive, the improvement comprising:

a clamp; and means connected to said clamp for spacing said clamp from a storage disk placed in contact with said means for spacing, said clamp and said means for spacing being of one piece construction, means for spacing including an end portion, and a neck portion interconnecting said end portion to said clamp, said neck portion extending substantially perpendicularly to said clamp.

12. A disk drive, as claimed in claim 11, wherein:

said clamp further includes at least one arcuate groove formed on a top face thereof.

13. A disk drive, as claimed in claim 11, wherein:

said clamp further includes at least one access bore formed on a top face thereof.

* * * * *

UNITED STATES PATENT AND TRADEMARK OFFICE
CERTIFICATE OF CORRECTION

PATENT NO. : 6,624,967 B1  
DATED : September 23, 2003  
INVENTOR(S) : Suwito

It is certified that error appears in the above-identified patent and that said Letters Patent is hereby corrected as shown below:

Column 5,  
Line 5, after "one piece construction," please insert -- said -- therein.

Signed and Sealed this

Twenty-seventh Day of July, 2004

JON W. DUDAS  
*Acting Director of the United States Patent and Trademark Office*